3,758,284
POROUS MATERIAL AND METHOD OF MAKING THE SAME
Wolfgang Haller, 5400 Pooks Hill Road, Apt. 912, Bethesda, Md. 20014
Original application Nov. 10, 1965, Ser. No. 507,092. Divided and this application Dec. 17, 1970, Ser. No. 99,218
Int. Cl. C03c 15/00; C03b 5/16
U.S. Cl. 65—31
14 Claims

ABSTRACT OF THE DISCLOSURE

A porous glass having a more uniform pore size distribution useful, e.g., as a separation medium, is produced from a melt of a ternary system which can be separated by heat treatment into two immiscible phases. After cooling one phase is leached out. The heat treatment is in accordance with the formula $$r^n = kte^{-m/T}$$

where $r$ is desired pore radius (A.), $t$ is time in hours, T is temperature (° K.), and $m$, $n$ and $k$ are experimentally determined constants.

---

This application is a division of application Ser. No. 507,092, filed Nov. 10, 1965, now Pat. No. 3,549,524.

A non-exclusive license to make and use for governmental purposes the invention described herein has been granted to the United States of America.

The present invention relates to a novel method of making a porous glassy medium. More particularly, the instant invention relates to a novel process including a heat treatment schedule to produce a porous glass medium having a controllable pore size of narrow size distribution and having modified surface properties. The novel porous glass medium of this invention is essentially inert to substances with which it comes into contact and is susceptible to strong cleaning agents and sterilization without materially affecting its physical or chemical properties.

Heretofore, a porous medium having a controllable pore size of narrow distribution was not easily achieved, if achieved at all. It has been known, for instance, to provide a porous medium from gels such as agar, crosslinked dextrane, polyacrylamide, and the like. Ordinarily, the porous medium is made by hydrogen bonding or polymerizing a monomer of the substance in the presence of a solvent. The resulting structure has generally been characterized as a loose network interpenetrated by the solvent. A large monomer concentration, initially, generally results in a dense network with small pores and small pore volume while a low monomer concentration usually results in a loose network with large pores and large pore volume. The structure, however, exhibits a wide pore distribution and efforts to control the pore distribution have not proved successful. Additionally, the resulting porous medium is of low mechanical strength and when employed as a granular bed it has been found to have a pronounced tendency to compact under its own weight thus seriously minimizing or reducing the void or interparticle space. It has also been found that a porous gel medium shrinks and swells depending on the content of its pores. The pore size changes with the nature of the solvent employed, thus resulting in non-reproducible characteristics. As it is generally not feasible to measure the pore size of such gel material by independent means such as electromicroscopy, mercury intrusion, gas-adsorption or the like since these techniques require that the porous material be dry, the function or effectiveness of the material is not easily predictable. It is known that drying gels causes the pores to collapse and the pore sizes thus measured are not the ones which are effective in use.

Another disadvantage of conventional porous gel media is the frequent non-applicability of such gels in biological studies and investigations since they are temperature sensitive or susceptible to, for instance, microbial spoilage. They cannot, therefore, tolerate exposure to ambient temperature for any prolonged period of time. Consequently, the use of such gels is possible, generally, only when a low temperature operation is performed. Moreover, porous gel media which have become spoiled either by microbial fouling or adsorption generally have to be discarded since their organic nature does not permit the use of strongly oxidizing flushing agents. Similarly, organic gels suffer under heat sterilization thus discouraging their widespread acceptance in industrial operations such as the preparation of vaccines and immune sera.

Efforts to provide a porous medium other than by gelling have not heretofore proved successful in overcoming the above enumerated disadvantages. For instance, it has been found that an inert, inorganic material which would tolerate strong cleaning agents and sterilization such as silica gel suffered under the same limitations of pore size and strength as the above-mentioned organic gels. Yet another type of silicious material employed, i.e. a ceramic porous medium while rigid and inert was found to be disadvantageous since its pore size and pore distribution depended on initial size fractionation, before sintering, of particles of about the same magnitude as the pore size desired. The lowest pore size range of ceramic bodies with fairly uniform pore size has been found to be about one micron. Additionally, it has been noted that the pore volume of such bodies is relatively low.

It is therefore a principal object of the instant invention to overcome the disadvantages of prior art porous media.

It is another object of the instant invention to provide an improved porous medium.

It is a further object of the instant invention to provide an improved process for producing a porous medium.

Yet another object of the instant invention is to provide an improved method for controlling the pore size of a porous medium whereby the pore size is narrowly distributed.

Further objects and advantages of the instant invention will best be understood by reference to the following specification taken in connection with the accompanying drawings, in which.

Figure 1:
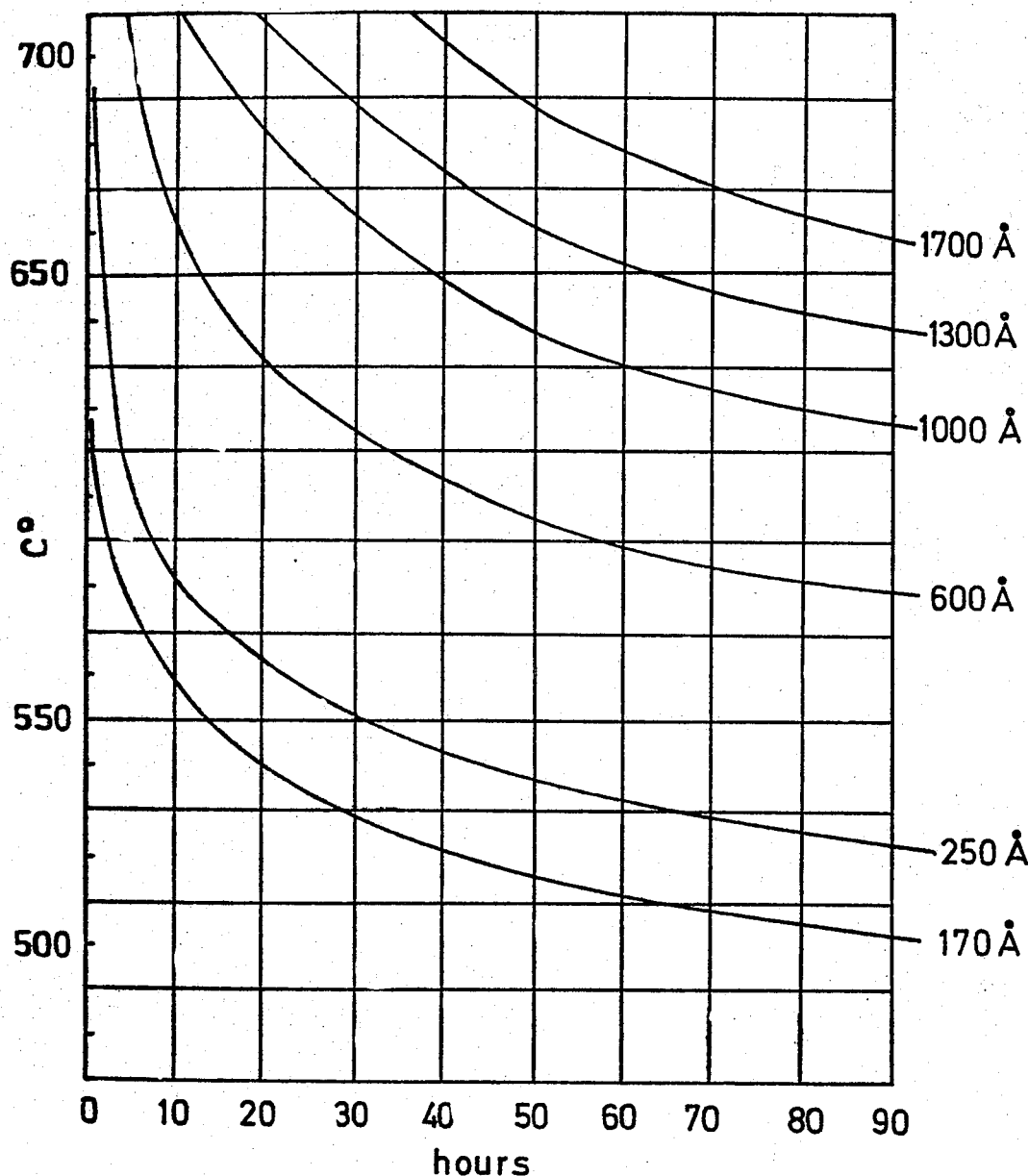
FIG. 1 is a graph showing the relationship o fthe heat treatment operation versus the controlled pore diameter, the relationship generally being expressed by the equation $r^n = kte^{-m/T}$ where $r$=pore radius (A.), $k$, $m$ and $n$=constants, $t$=treatment time (hrs.) and T=treatment temperature (° K.)
Figure 5:
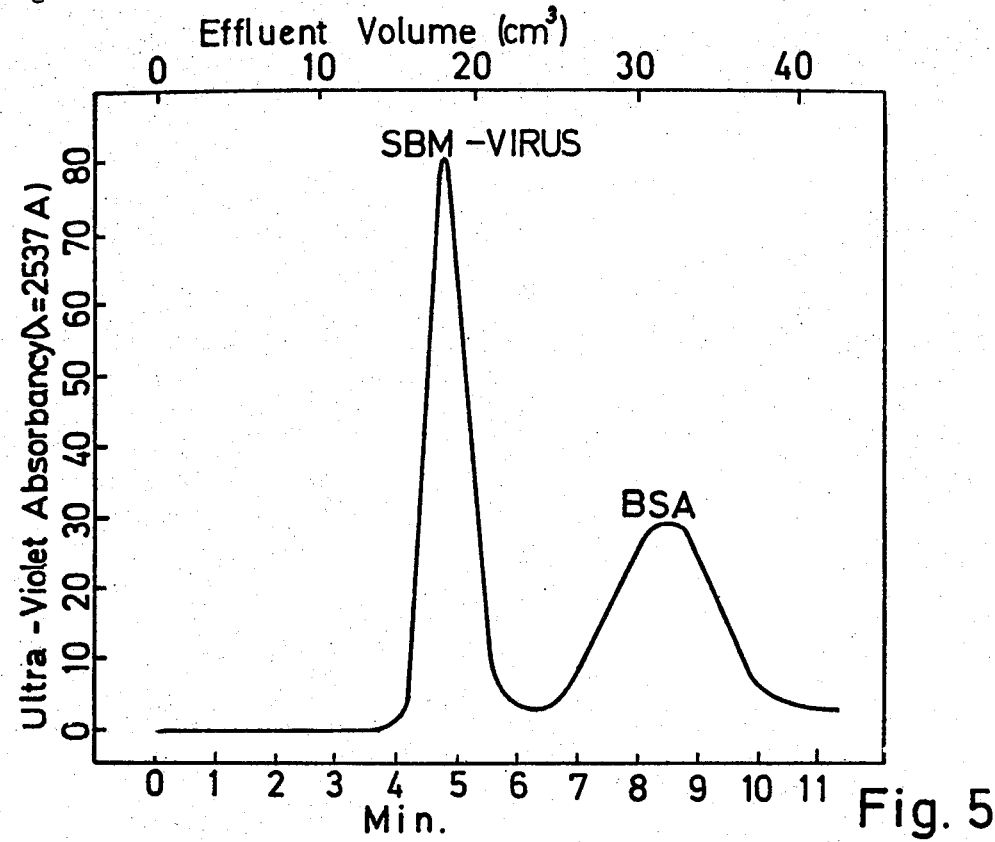
FIG. 5 is a graph showing chromatographic separation of a mixture of southern bean mosaic virus and bovine albumin (Fraction V), using the porous medium of this invention.

In practicing the instant invention, a porous medium is prepared from a base glass having a composition which lies in a limited region of the ternary system $$R_yO \cdot B_2O_3 \cdot SiO_2$$

wherein said region comprises compositions which will separate by heat treatment into at least two phases, one of which is easily decomposable and the other substantially undecomposable. The term $R_yO$ means any of the alkaline earth, alkali metal or heavy metal oxides wherein $R_yO$ can be $Li_2O$, $Na_2O$, $K_2O$, CaO, BaO, MgO, BeO, SrO, ZnO or PbO, or any combination thereof and y is 1 to 2 depending upon the valence of the metal R. It has also been found that the advantages of this invention can be secured by replacing the silica with, for instance, germanium ($GeO_2$). Advantageously, the base glass composition can, for instance, be of the type described in U.S. Pats. 2,106,744 and 2,215,039. It is important that the mixture of oxides chosen displays an immiscibility gap, i.e. that the melt of the oxides, when above a predetermined temperature, is a substantially homogeneous liquid and, when below said predetermined temperature, segregates into at least two immiscible liquids. In addition to the mixture of oxides displaying such an immiscibility gap, it is also important that the volume ratio of the phases be between 1:2 and 2:1, i.e. approximately equal and that the chemical durability of each phase differs substantially enough to permit selective leaching. Representative suitable mixtures of oxides include compositions wherein the base glass silica is present in amounts ranging from 50 to 83 weight percent, the $R_yO$, e.g. soda, potash, lithia, etc., is present in amounts ranging from about 2 to 10 weight percent and the boric oxide is present in amounts from about 8 to 48 weight percent.

A critical feature of the instant invention resides in the heat treatment of the mixture of oxides chosen. It has been found that the pore size and the narrow distribution thereof in the resulting material can effectively be controlled and is dependent on the thermal history of the glass. The depedence of the pore size and the distribution thereof on the thermal history of the glass has been found to be conveniently expressed according to the relationship

$$r^n = kte^{-m/T}$$

where
r = pore radius (A.)
k, m and n = constants
T = treatment temperature (Kelvin °), and
t = time (hrs.)

It has been found that generally the treatment can be effected at a temperature ranging from 400 to 950° C. (673 to 1223° K.) for a period ranging from about 2 hours to 4 weeks although it wil be recognized that the upper ranges of time and the lower ranges of temperature generally are limited only by practical considerations.

It should also be recognized that a pore size of desired distribution can be achieved by casting, melt spinning or flame-blowing the mixture of oxides, the time and temperature relationship defined above being maintained in such physical manipulations.

In the novel method of this invention, the glass, after undergoing a heat treatment in accordance with the above equation, is cooled and, if desired, crushed or comminuted to a preselected size. In case that the shaping method employed produces a skin of changed composition on the article, it may be necessary to remove this skin by abrasion or etching. The cooled glass, be it reduced to a preselected discrete particle size or formed into any other desired shape is then treated to retain at least one of the microphases with the concomitant removal of, substantially, the remaining microphases. Ordinarily, the silica-rich phase is retained while the silica-poor, or boron-rich phase is removed by leaching with an acid. It has been found that the rigid pores of the resulting silica-rich phase skeleton are substantially filled with colloidal silica which is a decomposition product of the removed microphase. After washing the rigid, porous skeleton in an aqueous solution, the skeleton is treated with a solvent for the colloidal silica, preferably, a dilute solution of hydrofluoric acid or sodium hydroxide, for a time sufficient to remove the colloidal silica without substantial attack of the skeleton itself. Ordinarily, the colloidal silica solvent treatment time will range from about one to four hours. Thereafter, the skeleton can be dried and the dried skeleton thus comprises a rigid matrix provided with a continuous system of intercommunicating pores substantially free of contaminants.

EXAMPLE I

An alkali borosilicate glass composition exhibiting an immiscibility gap as defined hereinbefore was produced by mixing in a ball mill analytical grade sodium carbonate, boric acid and ground quartz in a proportion equivalent to $Na_2O$ to $B_2O_3$ to $SiO_2$ weight ratio of 6.9 to 25.7 to 67.4, respectively. The mixture was fused in an electric furnace at 1200° C. until the major amount of $H_2O$ and $CO_2$ was expelled. The temperature was then elevated to 1450° C. and maintained while stirring for five hours. The melt was a substantially homogeneous mixture. Thereafter, the melt was chilled by pouring onto a cold steel plate. A chemical analysis of the glass gave 6.0% $Na_2O$, 25.6% $B_2O_3$ and 68.4% $SiO_2$, by weight.

Eleven samples of glass made in accordance with the above procedure were heat treated in an electric muffle furnace with thermocouple readout and proportional control. The treatment times and temperatures varied as indicated in Table I, below. The appearance of the heat-treated glasses depended on their thermal history and it ranged from completely clear over bluish-yellowish opalescent to a completely opaque white.

The eleven samples of heat-treated glass were crushed into small pieces in a steel mortar and fractionated by screening on stainless steel screens. Unless otherwise indicated, fraction ranging in size between 0.03 and 0.015 cm. of grain diameter (50–100 mesh U.S.S.-ASTM sieves) were retained for further processing.

The silica-poor phase in each of the eleven samples of glass was removed by contacting the fractionated glass particles with 3 N HCl at 50° C. for a period of six hours. This contact also served to remove any iron contamination picked up from the mortar. The acid solution was decanted and the fractionated glass particles subjected to a second acid leaching treatment for a period of eighteen hours. The ratio of original glass powder to acid was maintained, essentially, at 50 grams to 400 milliliters. After the acid leach treatment the discrete particles of glass were washed with water until the supernatant liquid was neutral and free of visible colloidal silica. Inasmuch as the silica-poor phase also contains silica in addition to water-soluble sodium borate, this silica is precipitated during the leaching process with the greater part thereof remaining in the pores of the silica-rich particles. To remove the colloidal silica precipitate from the pores of the silica-rich particles and thus provide an effective porous medium in accordance with the instant invention, the particles are contacted with a solvent for the colloidal silica. The particles were contacted with a 0.5 N NaOH solution at 25° C. for two hours. Thereafter, the glass particles were washed with water until neutral, stirred with cold 3 N HCl for two hours and extracted with cold water for twenty hours. The essentially colloidal silica-free particles were then washed with boiling water for 4.5 hours in an extractor and vacuum dried at 100° C. for twenty-four hours.

Subsequently, mercury intrusion pore size measurements were determined and calculated according to the method described in ASTM Bull., 39 (February 1959), by N. M. Winslow and J. J. Shapiro.

TABLE I

| Sample | Temp. (° C.) | Time (hrs.) | Appearance of glass block 1/cm. thick | Pore size, A |
|---|---|---|---|---|
| 1 | 564 | 4 | Transparent | 125 |
| 2 | 564 | 8 | do | 150 |
| 3 | 564 | 16 | do | 200 |
| 4 | 600 | 4 | do | 175 |
| 5 | 600 | 8 | do | 250 |
| 6 | 640 | 16 | do | 575 |
| 7 | 661 | 16 | Opaque | 755 |
| 8 | 684 | 16 | Opaque white | 950 |
| 9 | 708 | 4 | Opaque opalescent | 620 |
| 10 | 708 | 8 | Opaque white | 875 |
| 11 | 708 | 16 | do | 1,250 |

These data and similar data form the graph shown in FIG. 1 and it will be apparent that the family of curves therein can best be expressed by the relationship $$r^n = kte^{-m/T}$$

where $r$ = the pore radius (A.)
$k$, $m$ and $n$ = constants
$t$ = time (hours), and
$T$ = treatment temperature (° K.)

The above equation thus makes it possible to provide heat treatment schedules which result in microheterogeneous glasses exhibiting predetermined microphase dimensions, i.e. having a controlled pore size of narrow distribution.

It will be recognized, of course, that the terms in the above equation can vary according to a particular type of base glass composition chosen and it will be obvious that the choice of any particular base glass composition will depend on a number of easily ascertainable factors determinable by those skilled in the art. Such considerations, of course, can include the ultimate use of the porous media, the material with which it comes into contact, the temperature to which it is exposed, etc.

EXAMPLE II

Figure 2:
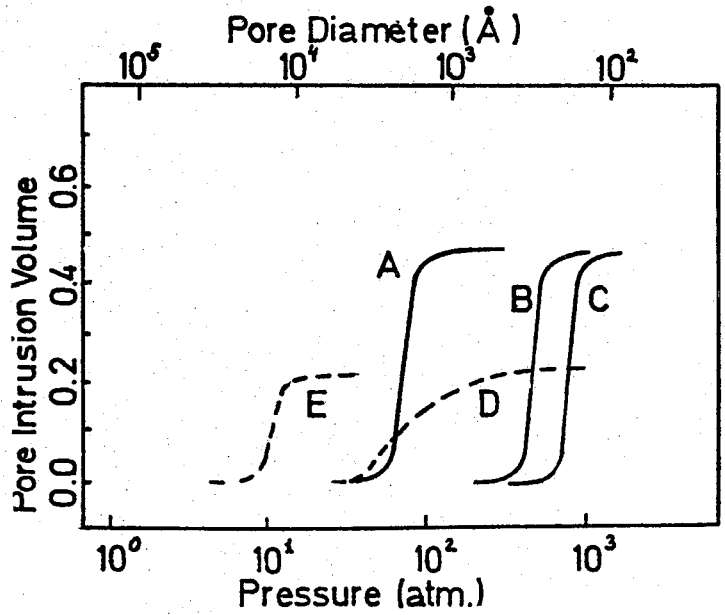
FIG. 2 is a graph showing the pore size distribtuion of porous media made in accordance with this invention and of conventional ceramic porous media.

Three samples of porous glass prepared in accordance with the method described in Example I exhibited average pore diameters of 170 A., 260 A. and 1700 A. measured by mercury intrusion. The free pore space of the glass samples was 47–53 percent independent of pore size. The integral pore size distribution curves of these glasses as determined by mercury intrusion technique based on a wetting angle of 135° as outlined in ASTM Bull., 39, February 1959 (referred to above) are shown as curves C, B and A, respectively, in FIG. 2. The average pore size of the glass is defined as the pore diameter which was penetrated when half of the total volume available for mercury became filled. The pore size distribution of glasses made in accordance with the invention is compared with the pore size distribution of conventional ceram- bodies shown as curves D and E in FIG. 2. As can be seen, ceramic bodies exhibit a substantially broader pore distribution. Ninety-five percent of the pore space of the porous glasses lies within less than ±20 percent of their average pore size while for the ceramic bodies E and D, these figures are ±30 and ±87 percent, respectively. A comparison with conventional crosslinked organic gels was not possible by this method since the structure of the gels collapsed on drying.

The above described porous glass media can also be treated to modify their surface properties.

These media have surface properties very similar to amorphous silica or normal glass. Such surfaces are known to be slightly negatively charged and also are known to adsorb and alter (denature) certain substances such as proteins. While for many applications the non-modified surface of the porous glass is quite suitable, particularly when the negative charge produces additional separation effects superimposed upon the size effects, it may be desirable for other applications to alter the chemistry of the surfaces. Methods employed to alter other glass surfaces may be employed. For instance, the dry porous glass can be reacted for 5 days with boiling trimethylmonochlorosilane. The resulting glass has a methylated surface which does not adsorb water and can therefore be used for chromatography in non-aqueous solvents without the pores of the glass becoming clogged up with water picked up from wet solvents.

It may also be desirable to reverse the surface charge of the glass from negative to positive. It has been found that this can be accomplished by treating the glass for 1 hour with a freshly prepared aqueous solution of 1.2 weight percent gamma - amino - propyltriethoxysilane (A1100-Union Carbide).

The resulting glass had a positive charge as demonstrated by adsorption of a negative dye. The surface modification was found to inhibit the adsorption of amphoteric biological substances if low pH eluants were used. It also can be used to separate substances by isoelectric point and by charge.

Instead of permanently attaching other groups to the glass surface, one can alter the surface of the glass by adding glass-surface active substances to the solutions while performing the separation or characterization process. Anionic or non-ionic detergents are representative of such suitable substances. For example, quaternary ammonium compounds can be used. In working with virus suspensions it has been found beneficial to block the protein-adsorbing groups of the glass by adding an excess of low-molecular (compared with the virus size) serum proteins to prevent adsorption of the virus.

The porous medium having modified or non-modified surface properties has been found to be suitably employed in apparatus for discriminating between molecules, cells and virus of different sizes. The porous medium in such apparatus can be in the form, for instance, of grains or a membrane. When the porous medium is in grain form, it can conveniently be employed in apparatus employed in batchwise or continuous operations. An example of such a continuous operation is steric exclusion chromatography.

While chromatographic separation techniques have long been known, the essential mechanism of such techniques is surface adsorption. In a classical example, a bed of adsorbent powder is confined in the lower part of vertical glass column and is supported by a porous disk, the space around adsorbent being filled with a solvent. Thereafter, the substance to be separated is introduced at one end of the column and a flow of solvent established thus carrying the deposited substance through the column. Depending on the degree of adsorption of the adsorbent for the components of the substance, the migration of the components through the column is delayed. The velocity with which a specific component migrates through the column depends on the nature of the solvent as well as the adsorptive power of the surface of the adsorbent. Variations of this classical technique involve programming the solvent composition as well as the column temperature and column shape. Heretofore, porous media employed in adsorption chromatographs have incuded the porous glass media as described in U.S. Pats. 2,106,744; 2,215,039 and 3,114,692. The effectiveness of the porous media embodied in these patents depends on their affinity for the components being separated and not on their pore size.

However, in recent years another type of chromatography has emerged. Unlike classic adsorptive chromatography, the new technique does not primarily utilize differences in interaction between molecules to be separated and the surface groups of the adsorbent. The new technique employs a column filled with granules of a porous substance. Again unlike adsorptive chromatography where the pores are simply means of creating a large effective surface area for adsorption, in the new type of chromatography the size of the pores is a critical parameter of the separation process. This new type of chromatography has, amongst other names, been called steric exclusion chromatography, the name denoting the separating mechanism or the column material used.

According to a classic separation mechanism of steric exclusion chromatography, a column is filled with a bed of granules of a porous material. Solvent is introduced into the column to fill both the space between and within the granules. A small volume of the substance to be separated into its component parts is deposited at one end of the column and a flow of solvent is established through the column. The granules of the bed are generally so large that the space between the granules, which constitute the void or interparticle space, generally always permits passage of even the largest molecules. On the other hand, the pores of the granules are of the order of the dimension of the molecules, or particles, to be separated. Thus, molecules too large to enter these pores are simply carried through the interparticle space of the column by the eluant and emerge with it at the other end of the column.

Molecules or particles which are small enough to enter the pores in the granules diffuse in and out of the pores as the stream of eluant carries them past the pore entrances. They thus undergo a migration delay which results in a separation by size.

Heretofore materials which have been used for steric exclusion chromatography have been gels such as cross-linked dextrane; polyacrylamide and agar as described hereinbefore.

EXAMPLE III

Figure 3:
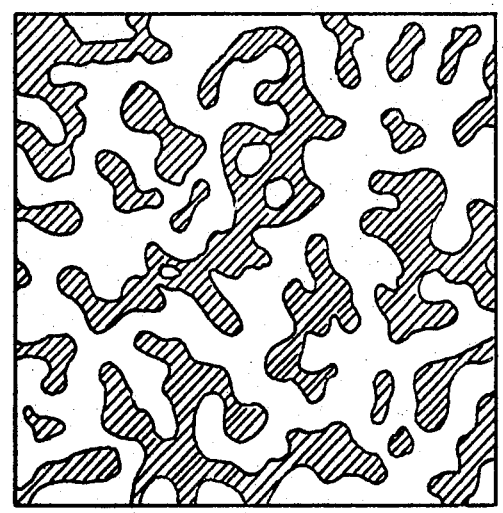
FIG. 3 is a partial cross-sectional view of a porous medium made in accordance with the instant invention.

Using a porous medium made in accordance with the method described in Example I and having an average pore diameter of 1700 A., a steric exclusion chromatographic separation of a mixture of tobacco mosaic virus and tobacco ring spot virus was performed. The column used in this investigation consisted of a 50 cm. long glass envelope having an internal diameter of 1 cm. and closed on both ends with coarse fritted glass disks. An aqueous suspension of the particles of the porous glass medium made according to the method of Example I and having an average pore diameter of 1700 A. was introduced into the column. A particle size fraction of 50–100 mesh size was employed. The disk-to-disk volume of the column was 41 cm.$^3$. The amount of porous glass medium (dry weight basis) was 24 grams. The porous glass had a pore volume of 50 percent and a true specific weight of 2. The eluant was 0.01 M phosphate buffer of pH 7.0 containing 0.85 percent sodium chloride. Flow was by gravity from a reservoir supported 2 meters above the column outlet. The flow rate was adjusted to 5.2 cm.$^3$ min.$^{-1}$/cm.$^2$. The sample to be separated was a mixture of purified tobacco mosaic virus (TMV) and tobacco ring spot virus (TRSV); the mixture containing approximately $10^{11}$ particles of each virus in 0.06 cm.$^3$ saline buffer. As can be seen from FIG. 3, the separation was essentially completed in less than 10 minutes. The tobacco mosaic virus appeared at 18 cm.$^3$ effluent peak position which is the dead-space of the column. TMV consists mainly of rods 3000 A. long and 150 A. in diameter, indicating that the length of the virus prevented it from entering the pores of the porous glass medium, due to the rotation motion of TMV in the solution. TRSV consists of polyhedra of 260 A. diameter. These entered the 1700 A. pores of the glass medium readily and the effluent peak for TRSV was close to the 30 cm.$^3$,

EXAMPLE IV

Figure 4:
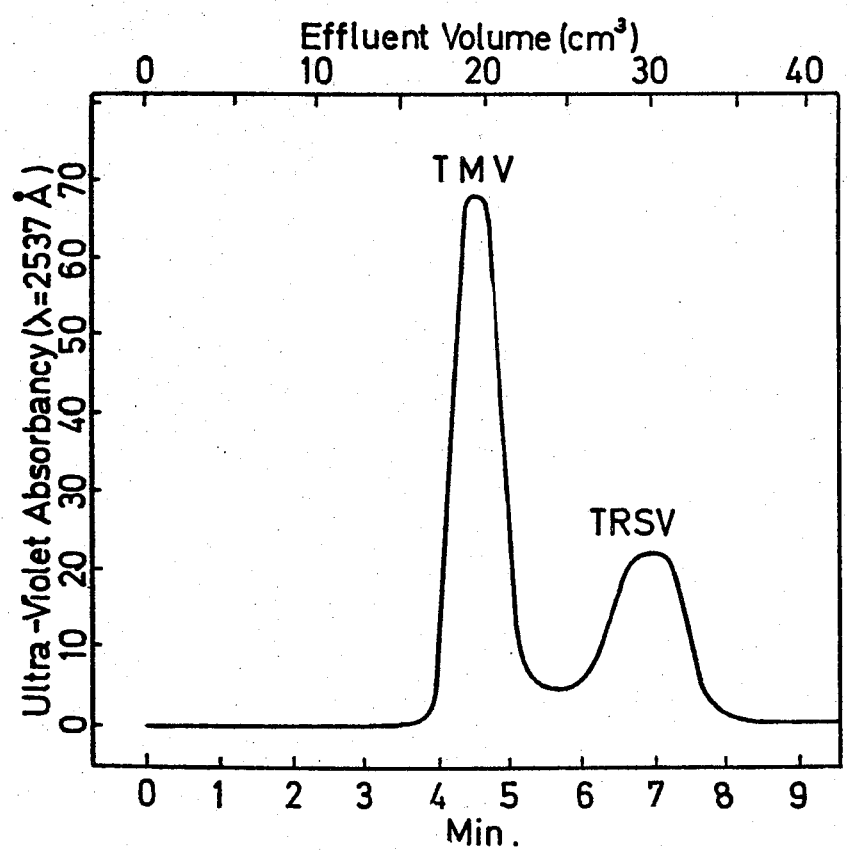
FIG. 4 is a graph showing chromatographic separation of a mixture of tobacco mosaic virus and tobacco ring spot virus employing a porous medium made according to the invention.

Another example of the effectiveness of the porous medium of this invention in steric exclusion chromatography is illustrated by the following investigation. A column as described in Example II was filled with a porous glass medium, again made in accordance with the methods outlined in Example I, having an average pore diameter of 260 A. and a particle size ranging from 50–100 mesh. A mixture of bovine serum albumin—"Fraction V" (BSA) and purified southern bean mosaic (SBMV) was introduced into the column. The sample mixture consisted of 0.5 cm.$^3$ saline buffer containing 0.05 gram (dry) BSA and approximately $10^{11}$ particles of SBMV. The eluant was the same as in Example II and the flow rate established was 4.6 cm.$^3$ min.$^{-1}$/cm.$^2$. As can be seen in FIG. 4, the separation was essentially completed within 10 minutes. The SBMV which has a diameter of 286 A. does not enter the 260 A. pores of the porous glass medium. The BSA with a molecular weight of $7 \times 10^4$ is smaller than the pores and is delayed for the full pore space of the glass medium.

From the Examples III and IV, it can readily be seen that the instant invention provides a porous medium having a controlled pore size which makes it advantageously suitable in the separation of macromolecular substances, virus particles and cell components. Because of the rigidity of the chromatographic bed, its chemical inertness and low flow resistances such separations are characterized by their speed and reproducibility. Further, the porous glass medium made according to the invention has the ability to withstand heat sterilization and cleaning with hot nitric acid thus making feasible the removal of organic contaminants. The choice of any pore size of the porous medium can be preselected dependent on the nature of the substance to be separated and then achieved in accordance with the heat treatment method described above.

The porous glass medium, preferably in grain form, i.e. of discrete particulate size, can also be used as an analyzer to determine quantitatively the distribution of various substances in a mixture without necessarily collecting the separated fractions. An analyzer made in accordance with the instant invention comprises an eluant supply and pump means therefor, an injection system for introducing the mixture into a column, a chromatographic column filled with the porous material and a detector which monitors the concentration of substances in the effluent stream. The effluent can, of course, also be collected in fractions and the concentration of substances determined in the fractions. Additionally, the fractions if separately collected can be used for other purposes. As the various substances emerge from the columns as a function of their molecular size, the time versus concentration curve indicates the quantitative distribution of the substances in the mixture.

Since the pore distribution of a porous glass medium can be sharply controlled in accordance with the instant invention a sharp substance separation can be effected. In other words, analyzers provided in accordance with the principles of this invention can effect a high resolution over a relatively narrow molecular size range. It will be apparent, however, that the molecular size range can be extended by mixing grains of a porous glass with various pore sizes. By selecting a predetermined amount of the various porous glasses a tailor-made column with any desired resolution profile can be achieved.

Since the pore size of a porous glass medium can be measured in the electron microscope, the position of a molecular-weight fraction or a single substance in the eluogram on a porous glass medium of known pore size can determine the molecular size of an unknown substance.

The novel porous medium of this invention, preferably when in the form of discrete particles, is also conveniently employed in batchwise operations, for example, desalting techniques. Additionally, a confined quantity of such dry discrete particles has been found effective in concentration techniques whereby a solution or dispersion containing a substance can be introduced therein with the smaller molecules comprising essentially, the solvent entering the pores of the porous medium. The larger molecules, comprising the substance to be concentrated, can be separated therefrom as by decanting, centrifuging or displacing to provide a more concentrated form thereof. The procedure can be repeated as often as desired.

The porous glass medium of this invention can also conveniently be provided in the form of a membrane. When so provided it has been found that a porous glass medium of known pore size can effectively be used to provide a filter or a diffusion barrier means whereby the passage therethrough of a substance, below or above a certain size, can be determined. Such a determination can be, for instance, used to evaluate the nature of a substance or as a diagnostic tool to determine the size of an infective virus.

In addition to the use of the porous glass medium of this invention in analytical apparatus such as the filter or diffusion barrier or membrane described above, the porous medium can be fabricated into a membrane which is effective in processing larger amounts of substances therethrough, for instance, the removal of virus particles from a solution or the separation of separate microglobulins and salt from macroglobulins.

While diffusion membranes rely on the transport of a substance by Brownian Movement across the barrier and a filtering operation depends on the superimposition of a hydraulic flow to obtain higher separation speeds, charged molecular species can be also transported across a membrane made in accordance with the instant invention by the application of an electrical field. The field not only speeds the movement of charged substances through the membrane but it also adds another separation criterion to the process since the migration direction and velocity of a substance depend on its charge (sign and magnitude) as well as upon its size. Thus such a porous glass membrane is not merely a conventional convection-hindering electrophoretic carrier since the size of its pores is a critical parameter of the separation mechanism.

In addition to providing from the novel porous medium of this invention apparatus suitable for discriminating between molecules, cells and virus of different size, apparatus having desirable electric and/or hydraulic flow properties and methods which depends on these characteristics have also been made with the novel porous medium of this invention.

It will thus be seen that there has been provided by this invention a process and product in which the various objects hereinbefore set forth, together with many practical advantages, are successfully achieved. As various possible embodiments may be made of the novel features of the above invention, all without departing from the scope thereof, it is to be understood that all matter hereinbefore set forth is to be interpreted as illustrative, and not in a limiting sense.

What is claimed is:

1. In a method of producing a porous siliceous material from a glass having a composition composed essentially of a ternary system $R_yO \cdot B_2O_3 \cdot SiO_2$ and containing about 2–10 weight percent $R_yO$, about 8–48 weight percent $B_2O_3$ and about 50–83 weight percent $SiO_2$, wherein $R_yO$ is at least one oxide selected from the group consisting of alkali metal, alkaline earth metal, and heavy metal oxides, and $y$ is 1 or 2 depending on the valence of the metal R, which glass is capable of forming a homogeneous melt above a given temperature and separating below said given temperature into two immiscible phases comprising a silica-rich phase and a boric oxide-rich phase, the improvement comprising heat treating the glass for a time and at a temperature of about 400–950° C. defined by the relationship $$r^n = kte^{-m/T}$$

where $r$ is desired pore radius within a range of about 30–2500 (A.) in final porous siliceous material; $k$, $m$ and $n$ are constants; $t$ is time (hours); and T is temperature (° K.), thereafter cooling the melt to below its melting point to form a two-phase glass comprising a silica-rich phase and a boric oxide-rich phase, contacting the resulting solidified two-phase glass with an acidic medium to substantially remove the boric oxide-rich phase while substantially retaining the silica-rich phase, contacting the silica-rich phase with a solvent to remove colloidal silica resulting from decomposition of said boric oxide-rich phase to leave a porous glass material comprised of said silica-rich phase containing interconnected pores of substantially uniform pore size with the pore radius $r$.

2. In a method of producing a porous glassy material from a glass having a composition composed essentially of a ternary system $R_yO \cdot B_2O_3 \cdot XO_2$ and containing about 2–10 weight percent $R_yO$, about 8–48 weight percent $B_2O_3$ and about 50–83 weight percent $XO_2$, where $R_yO$ is at least one oxide selected from the group consisting of alkali metal, alkaline earth metal, and heavy metal oxides, $y$ is 1 or 2 depending on the valence of the metal R, and $XO_2$ is at least one member of the group consisting of $SiO_2$ and $GeO_2$, which glass is capable of forming a homogeneous melt above a given temperature and separating below said given temperature into two immiscible phases comprising an $XO_2$-rich phase and a boric oxide-rich phase, the improvement comprising heat treating the glass for a time and at a temperature of about 400–950° C. defined by the relationship $$r^n = kte^{-m/T}$$

where $r$ is desired pore radius within a range of about 30–2500 (A.) in final porous glass material; $k$, $m$ and $n$ are constants; $t$ is time (hours); and T is temperature (° K.) to form in said melt a first phase of higher $XO_2$ content and lower boric oxide content and a second phase of lower $XO_2$ content and higher boric oxide content, thereafter cooling the melt to below its melting point to form a two-phase glass comprising said first phase and said second phase, leaching the resutling solidified two-phase glass with a solvent for said second phase which is a nonsolvent for said first phase to substantially decompose and remove said second phase while substantially retaining said first phase contacting said first phase with a solvent to dissolve and remove colloidal $XO_2$ resulting from decomposition of said second phase to leave a porous glassy material comprised of said first phase containing interconnected pores of substantially uniform pore size with the pore radius $r$.

3. A method as defined in claim 2, wherein $XO_2$ is $SiO_2$.

4. A method as defined in claim 2, wherein said solvent for said second phase is an acidic solution.

5. A method as defined in claim 2, wherein said dissolving and removing of said colloidal silica is carried out by leaching with dilute hydrofluoric acid or alkali metal hydroxide solution.

6. A method as defined in claim 2, wherein $R_yO$ is at least one member of the group consisting of $Li_2O$, $Na_2O$, $K_2O$, $CaO$, $BaO$, $MgO$, $BeO$, $SrO$, $ZnO$ and $PbO$.

7. A method as defined in claim 2, wherein the volume ratio of the two phases obtained by said heat-treatment is between 1:2 and 2:1.

8. A method as defined in claim 2, wherein said heat-treatment includes casting, melt spinning or flame blowing of said glass.

9. A method as defined in claim 2, wherein said glass prior to leaching is comminuted to a maximum particle size corresponding to 50 mesh.

10. A method as defined in claim 2, and including the step of treating the leached glass with a silane of the formula $X_nSiY_{(4-n)}$, wherein $n$ signifies an interger between 1 and 3, both inclusive, X signifies a member of the group consisting of halogen, alkyloxy, aryloxy and acyloxy, and Y signifies at least one organic residue.

11. A method as defined in claim 10, wherein $n$ is 1, X is chlorine and Y is methyl.

12. A method as defined in claim 10, wherein $n$ is 3, X is ethoxy and Y is aminopropyl.

13. A method as defined in claim 10, wherein said silane is selected from the group consisting of tri-methyl-monochlorosilane and gamma - amino - propyltriethoxysilane.

14. A method according to claim 2, further comprising experimentally determining the constants $k$, $m$ and $n$ by the steps of melting a batch of said glass having the composition $R_yO \cdot B_2O_3 \cdot XO_2$, heat treating at least three experimental portions of said batch to separate each into said first phase and said second phase, said heat treating steps being carried out for arbitrary times and at arbitrary temperatures; cooling the experimental portions to below their melting point; contacting the thus heat treated and solidified experimental portions of glass with a solvent for said second phase to substantially remove said second phase while substantially retaining said first phase; contacting said first phase of the experimental portions with a solvent to dissolve and remove colloidal $XO_2$ to form substantially colloidal $XO_2$-free pores therein; drying the thus obtained porous glasses; measuring the obtained pore radii of the porous glasses; and utilizing the measured pore radii and the experimental arbitrary times and temperatures to solve said relationship $$r^n = kte^{-m/T}$$

for $k$, $m$ and $n$.

References Cited
UNITED STATES PATENTS

| | | | |
|---|---|---|---|
| 1,928,021 | 9/1933 | King | 65—22 X |
| 2,106,744 | 2/1938 | Hood et al. | 65—22 X |
| 2,336,227 | 12/1943 | Dalton | 65—18 X |
| 2,834,738 | 5/1958 | Vincent | 65—18 X |
| 3,592,619 | 7/1971 | Elmer et al. | 65—18 X |

OTHER REFERENCES

Handbook of Glass Manufacture, vol. II, Tooley-Ogden Pub. Co., pp. 192–199.

FRANK W. MIGA, Primary Examiner

U.S. Cl. X.R.

65—33, 134, 18, 22